Nov. 28, 1939.  W. HERRSCHAFT  2,181,696
PROJECTION DEVICE
Filed Feb. 4, 1937   2 Sheets-Sheet 1
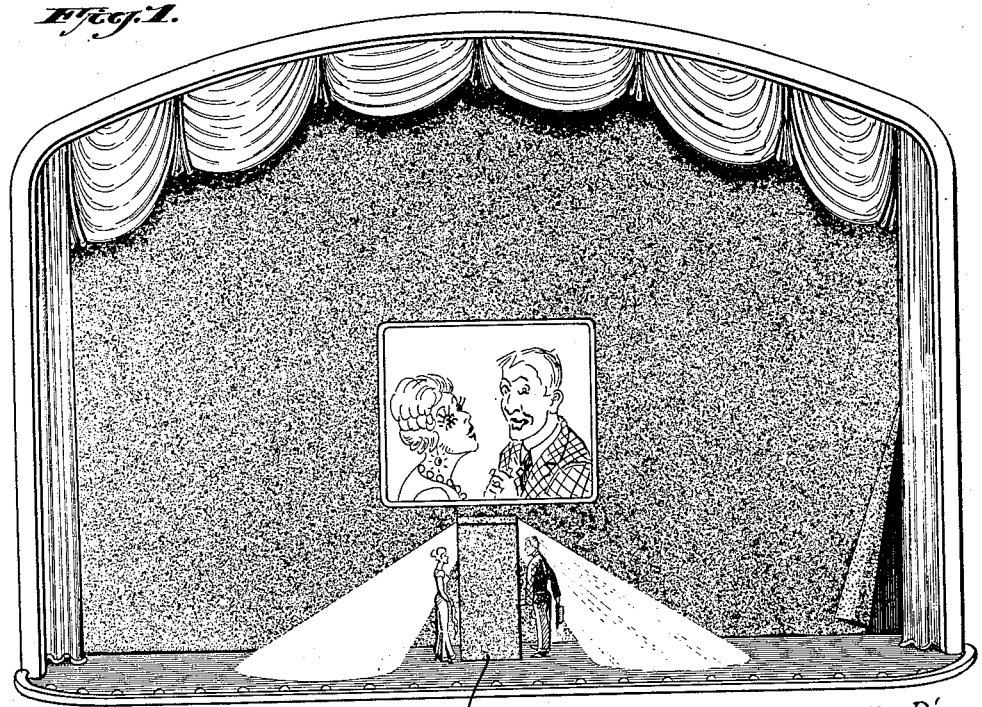
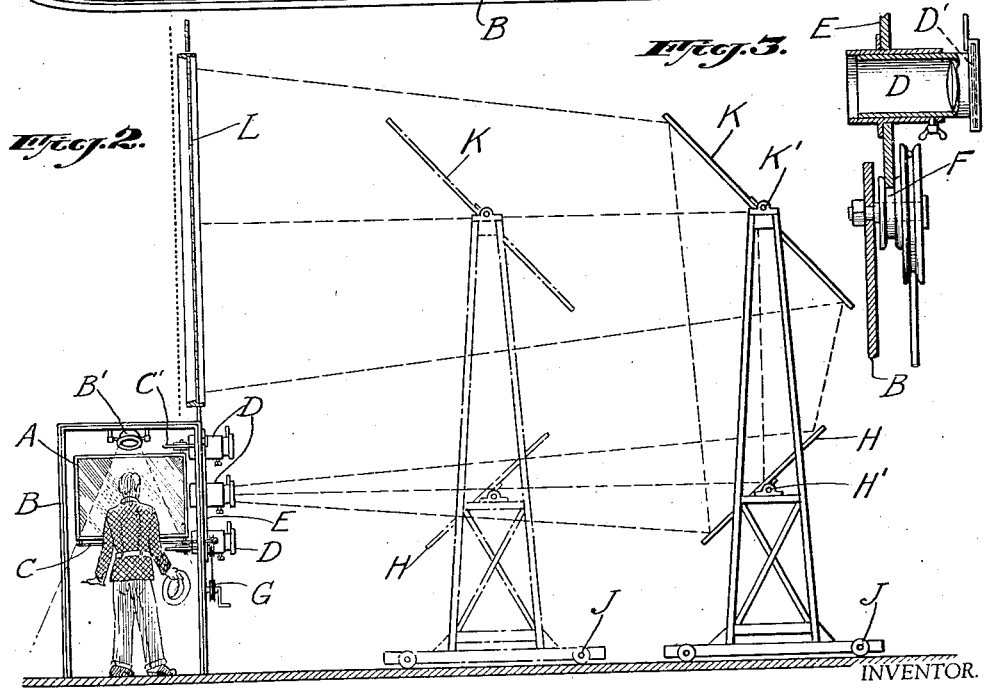
INVENTOR.
WILLIAM HERRSCHAFT.
BY
ATTORNEY.

Nov. 28, 1939.  W. HERRSCHAFT  2,181,696
PROJECTION DEVICE
Filed Feb. 4, 1937   2 Sheets-Sheet 2
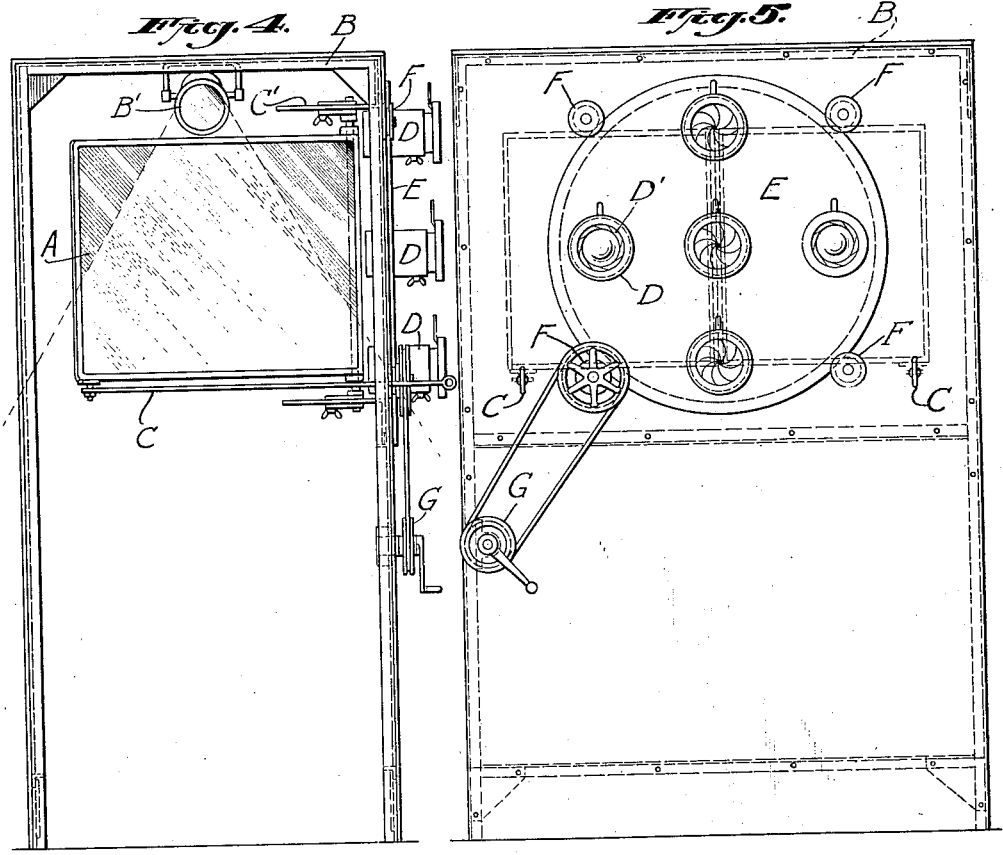
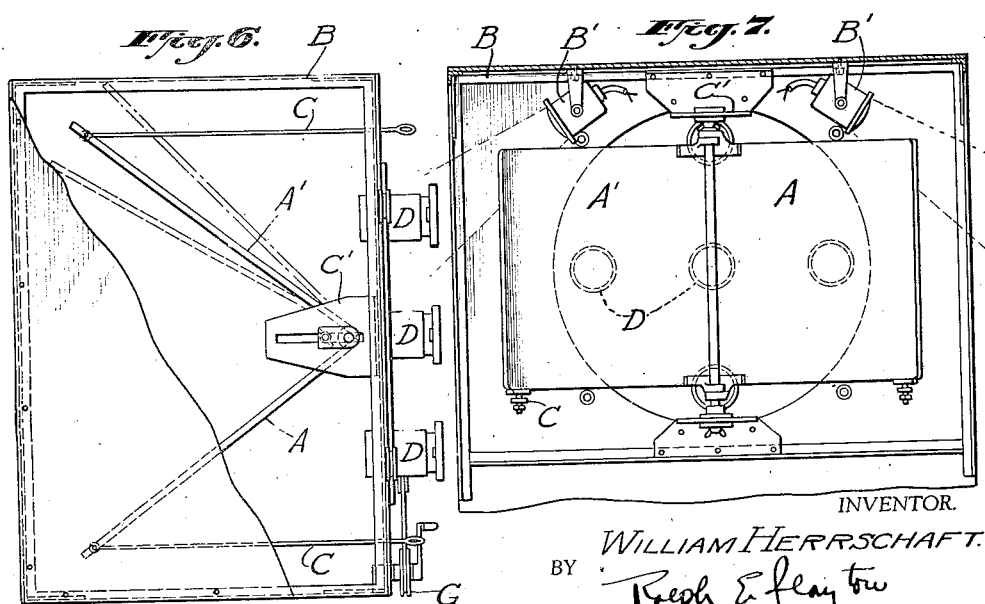
INVENTOR.
WILLIAM HERRSCHAFT.
BY
ATTORNEY.

Patented Nov. 28, 1939

2,181,696

UNITED STATES PATENT OFFICE 2,181,696

PROJECTION DEVICE

William Herrschaft, New York, N. Y.

Application February 4, 1937, Serial No. 123,944

2 Claims. (Cl. 88—24)

This invention relates to projection devices and has more particular reference to devices for securing novel stage projection effects.

Comprehensively stated, the invention comprises means for varying projected images obtained by reflection whereby various unique stage effects may be produced at will. More specifically stated, the invention comprises a plurality of reflecting surfaces with a plurality of adjustable lenses movable relatively to the reflecting surface to throw on a screen one or more images of one or more objects or performers.

In the drawings accompanying this specification, one embodiment of the invention is illustrated, although it is to be understood that such embodiment is merely for the purpose of affording a clear understanding of the underlying principles of the invention so that those skilled in the art may readily understand it without, however, limiting the invention to the specific details shown therein.

In said drawings:

Fig. 1 shows a stage arrangement for exhibiting the performers and their projected image to the audience.

Fig. 2 is a diagrammatic side elevation of the invention.

Fig. 3 is an enlarged detail of one of the lenses partly fragmentary and partly in section.

Fig. 4 is an enlarged side elevation of the reflecting elements and lens elements for initially transmitting the performers' image.

Fig. 5 is a rear elevation of the portion of the device shown in Fig. 4.

Fig. 6 is a top plan view of the portion of the device shown in Figs. 4 and 5, and Fig. 7 is a front elevation of the upper portion of the device shown in Figs. 4 and 5.

Continuing now by way of a more detailed description, vertical object reflecting mirrors A and A' are pivotally mounted on movable pivot points in a flood lighted cabinet B, the mirrors being conveniently held in proper angular position by manually operable push rods C slidably projecting through the rear of the cabinet B and connected to the front end of mirrors A and A'. The movable pivot points of the mirrors are guided in a slotted bracket C' and are conveniently held in place by set screws in order to facilitate variation in the relation of the plane of the mirror with respect to the object to be reflected. While the foregoing arrangement for holding the angular position of the mirrors may be used, it is to be understood that the reflecting mirrors might be controlled by other mechanism. The flood lighted cabinet B may be and preferably is open at each side and has conventional overhead flood lights B' arranged to illuminate the performers standing outside the cabinet in front of the reflecting mirrors A and A'. The reflecting mirrors A and A' are arranged to reflect the image or images toward a plurality of lenses D mounted on a rotatable disk E conveniently rolling in guide rolls F and adapted to be rotated by suitable drive mechanism as, for instance, the friction drive and belt arrangement shown. Each of the lenses D has an iris diaphragm D' which may be independently actuated thereby controlling the size of the opening for sharpening the image or for the purpose of cutting out any one of the lenses.

From the foregoing, it will be observed that the images reflected from the reflecting surfaces, or mirrors, A and A' are projected through the lenses D which may be linearly adjusted so as to vary the size of the image received on the lower reflecting surface H which is pivoted at H' and mounted on a rolling scaffold or pier J. The rolling pier J permits the size and position of the image to be easily varied. An upper reflecting surface K is adjustably mounted on the rolling pier J in a manner similar to the reflecting surface H and is adapted to receive and to reflect the image received by the reflecting surface H on a transparent or semi-transparent screen L. The image projected on the screen L is in view of the audience as well as the performers or objects under the floodlights B'. By changing the relation of the lenses and varying the speed of rotation of the disk E, and by changing the angular inclination of the reflecting surfaces, various effects may be obtained, for instance, fading in and out of the images, enlarging or diminishing the image, dissolving one image into another, and distorting the images by varying the lens focus. Various other effects may also be obtained by the use of the arrangement hereinbefore explained.

It is claimed:

1. A device for projecting image reflections upon a screen comprising a reflecting mirror angularly positioned and angularly adjustable, a light disposed adjacent said mirror, a disk movably mounted in the reflecting path of said mirror, said disk carrying a plurality of objective lenses of different focal lengths, the optical axis of said lenses being parallel to the axis of said disk, means to move said disk to bring different of said objective lenses into optical alignment with said mirror to project an object, and secondary mirrors in the projection path to direct the projection beam upon said screen, said secondary mirrors being angularly adjustable, whereby upon changing the angular position of the respective mirrors and moving said lens carrying disk different screen projection effects are obtained.

2. A device for projecting image reflections upon a screen, comprising a flood lighted cabinet, a vertically disposed mirror angularly positioned and angularly adjustable within said cabinet, said cabinet having an open side giving unobstructed access to said mirror, a disk rotatably mounted on said cabinet and carrying a plurality of objective lenses of different focal lengths, the optical axis of said lenses being parallel to the axis of said disk, means on said cabinet to rotate said disk to bring different of said objective lenses into optical alignment with said mirror and said open side to project an image of an object, and secondary mirrors in the projection path to direct the projection beam upon said screen, whereby upon changing the angular position of said mirrors and rotating said lens carrying disk different screen projection effects are obtained.

WILLIAM HERRSCHAFT.